United States Patent [19]

Sebby

[11] 4,113,272
[45] Sep. 12, 1978

[54] TOW BAR WITH TOWED VEHICLE SUSPENSION FEATURE

[76] Inventor: Carl M. Sebby, 211 Chateau Apartments, Minot, N. Dak. 58701

[21] Appl. No.: 812,896

[22] Filed: Jul. 5, 1977

[51] Int. Cl.² .......................................... B62D 53/04
[52] U.S. Cl. ................................. 280/402; 280/490 R
[58] Field of Search ............... 280/408, 490 R, 479 R, 280/479 A, 402

[56] References Cited

U.S. PATENT DOCUMENTS

| | | | |
|---|---|---|---|
| 1,943,594 | 1/1934 | Flatley | 280/490 R |
| 3,984,120 | 10/1976 | Boveia | 280/402 |
| 4,000,823 | 1/1977 | Aquila | 280/402 |

Primary Examiner—Robert R. Song
Assistant Examiner—R. Schrecengost
Attorney, Agent, or Firm—Clarence A. O'Brien; Harvey B. Jacobson

[57] ABSTRACT

First and second generally horizontal tow bar arm sections are provided and joined together at one pair of corresponding end portions in generally end aligned relation and for relative angular displacement about a horizontal transverse axis. The free end of one of the sections remote from the other section includes first structure for articulated connection to a towing vehicle and the free end of the other section remote from the aforementioned one section includes second structure for stationary attachment to a towed vehicle. In addition, third structure is operatively connected between the arm sections to forcibly effect relative angular displacement of the arm sections to depress the free ends relative to the joined end portions. The first structure comprises a socket hitch member for removable coupling to a ball hitch member of a towing vehicle and the second structure includes a terminal end shank portion for removable anchoring in an endwise outwardly opening socket member mounted on the towed vehicle. Further, the third structure includes a hydraulic ram.

15 Claims, 9 Drawing Figures

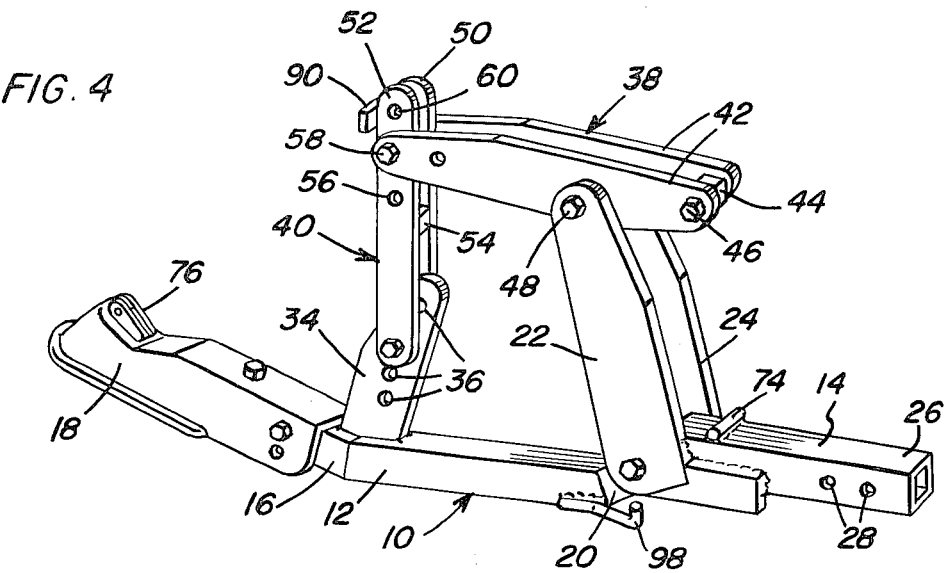
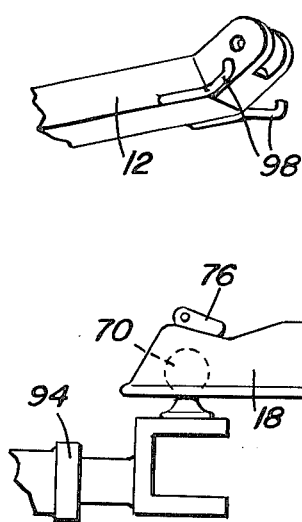
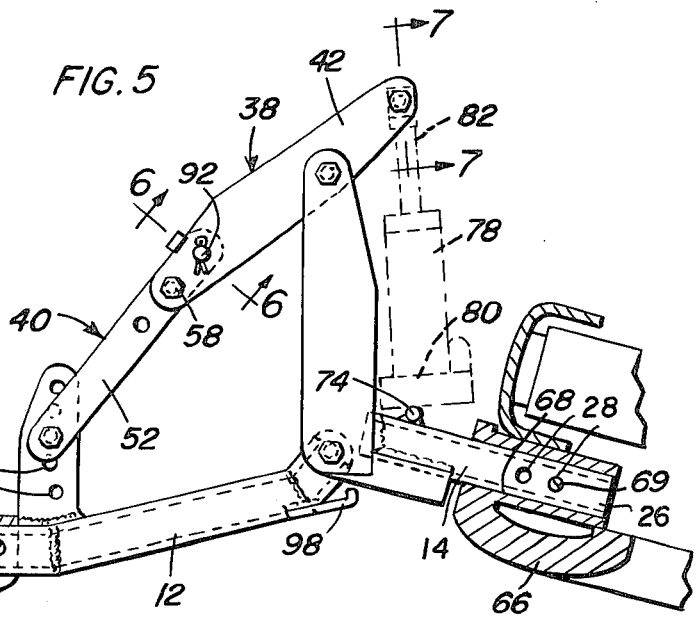
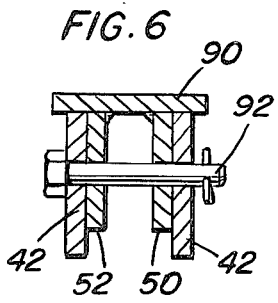
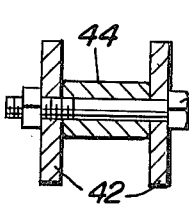
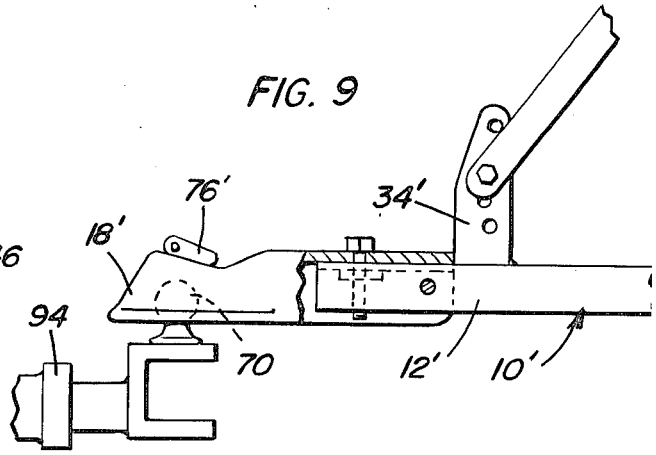

TOW BAR WITH TOWED VEHICLE SUSPENSION FEATURE

BACKGROUND OF THE INVENTION

Various forms of tow bar constructions have been heretofore provided for the purpose of towing one vehicle behind another vehicle. However, in many instances it is desired to trail a small vehicle behind a larger vehicle. Such an instance presents itself when it is desired to trail a small automobile behind a larger vehicle, such as a mobile home.

While some tow hitches are constructed whereby smaller automobiles may be towed behind larger vehicles, these latter tow hitches are for the most part of the type which are designed to tow the smaller automobiles with all four wheels thereof rollingly engaged with the ground. While these forms of tow hitches are capable of adequately towing smaller automobiles behind larger vehicles, excessive tire wear and front end component wear sometimes result from such a towing operation, inasmuch as the front wheels of the towed vehicle are rollingly engaged with the ground.

Other forms of tow hitches are operative to trail smaller automobiles behind larger vehicles with the forward end of the towed vehicle elevated relative to the associated roadway. However, these latter forms of tow hitches are quite complex and expensive. In addition, many of these latter forms of tow hitches generate considerable "tongue weight".

Accordingly, a need exists for a tow hitch which may be utilized to trail smaller automobiles behind larger vehicles with the forward wheels of the towed automobile elevated above the ground and with the tow hitch acting as an "equalizer" hitch to thereby minimize the "tongue weight", the forward wheels being the drive wheels of the vehicle if the latter is provided with an automatic transmission.

Examples of various forms of tow hitches utilizing some of the general structural and operational features of the instant invention are disclosed in U.S. Pat. Nos. 3,664,687, 3,776,572, 3,831,980 and 3,885,815.

SUMMARY OF THE INVENTION

The tow bar construction of the instant invention includes front and rear generally horizontal tow bar arm sections which are pivotally joined together at adjacent end portions in generally end aligned relation and for relative angular displacement about a horizontal transverse axis. The free end of the front arm section includes a socket hitch element for universal connection with the ball hitch element of a towed vehicle and the rear free end of the rear arm section includes a shank portion for removable anchoring in a forwardly and endwise outwardly opening socket member mounted on the forward end of the towed vehicle. A hydraulic ram is operatively connected between the arm sections to forcibly effect relative angular displacement of the arm sections to depress the free ends relative to the pivotally joined ends. In this manner, while the forward arm section may be pivoted to a substantially upright inoperative position when the rear section is generally horizontally disposed and has its rear end removably anchored in a forwardly and endwise outwardly opening socket member mounted on a vehicle to be towed, whereby the vehicle to be towed may be maneuvered into position for coupling to the towing vehicle, the hydraulic ram may be actuated in a manner whereby the free end of the forward arm section is swung downwardly to engage the socket hitch member on the free end thereof over a ball hitch member carried by the towing vehicle. Thereafter, after the socket and ball hitch members have been latched together against separation, the hydraulic ram may be further actuated to cause the free ends of the arm sections to be depressed relative to the pivotally joined ends and in this manner the hydraulic ram functions to cause the forward end of the toward vehicle to be elevated above the associated road surface. Accordingly, the tow bar of the instant invention is not only operative to trail a four-wheeled vehicle behind a towing vehicle with the forward wheels of the towed vehicle elevated above the ground, but the tow hitch is also operative to effect elevation of the front end of the towed vehicle relative to the associated roadway subsequent to the tow bar construction being removably coupled to the towing vehicle while all four wheels of the vehicle to be towed rest upon the ground.

The main object of this invention is to provide an improved tow bar for trailing a four-wheeled vehicle behind a towing vehicle with the forward end of the trailed vehicle elevated above the associated roadway.

Yet another object of this invention is to provide a tow bar construction, in accordance with the preceding object, which is also operative to effect elevation of the forward end of the towed vehicle after the tow bar has been operably connected to both the trailed vehicle and the towing vehicle.

A still further object of this invention is to provide a tow bar construction including means by which the relatively pivotable arm sections thereof may be locked in predetermined operative positions independent of the hydraulic ram.

Still another important object of this invention, in accordance with the preceding objects, is to provide a tow bar construction of the load "equalizer" type.

A final object of this invention to be specifically enumerated herein is to provide a tow bar construction, in accordance with the preceding objects, and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a perspective view of the tow bar;

FIG. 5 is a side elevational view of the tow bar in operative position and with the adjacent hitch portions of the trailed and towing vehicles operatively associated therewith, portions of the trailed vehicle and the tow bar being broken away and illustrated in vertical section;

FIG. 6 is an enlarged sectional view taken substantially upon the plane indicated by the section line 6—6 of FIG. 5;

FIG. 7 is an enlarged fragmentary sectional view taken substantially upon the plane indicated by the section line 7—7 of FIG. 5;

FIG. 8 is a fragmentary, perspective view of the rear end portion of the forward arm section of the tow bar; and FIG. 9 is a fragmentary, side, elevational view similar to the right hand portion of FIG. 5 but illustrating a modified form of forward arm section of the tow hitch.

DETAILED DESCRIPTION OF THE INVENTION

Figure 1:
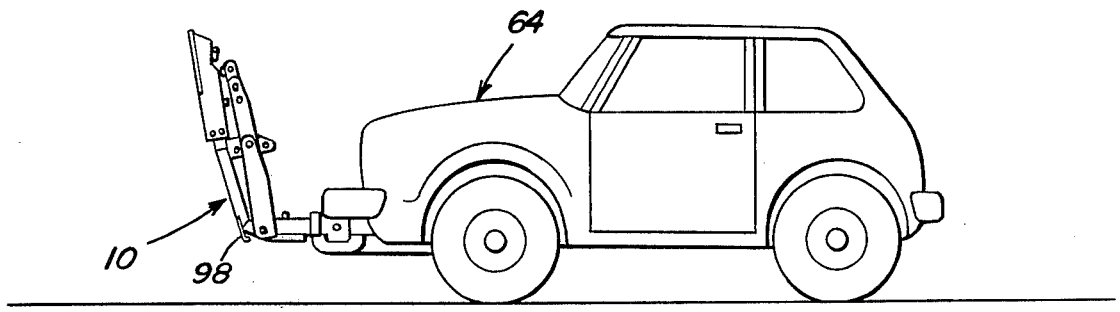
FIG. 1 is a side elevational view of a vehicle to be towed with the tow bar of the instant invention mounted thereon and the forward arm section of the tow bar in an elevated upstanding inoperative position enabling the towed vehicle to be driven under its own power.
Figure 2:
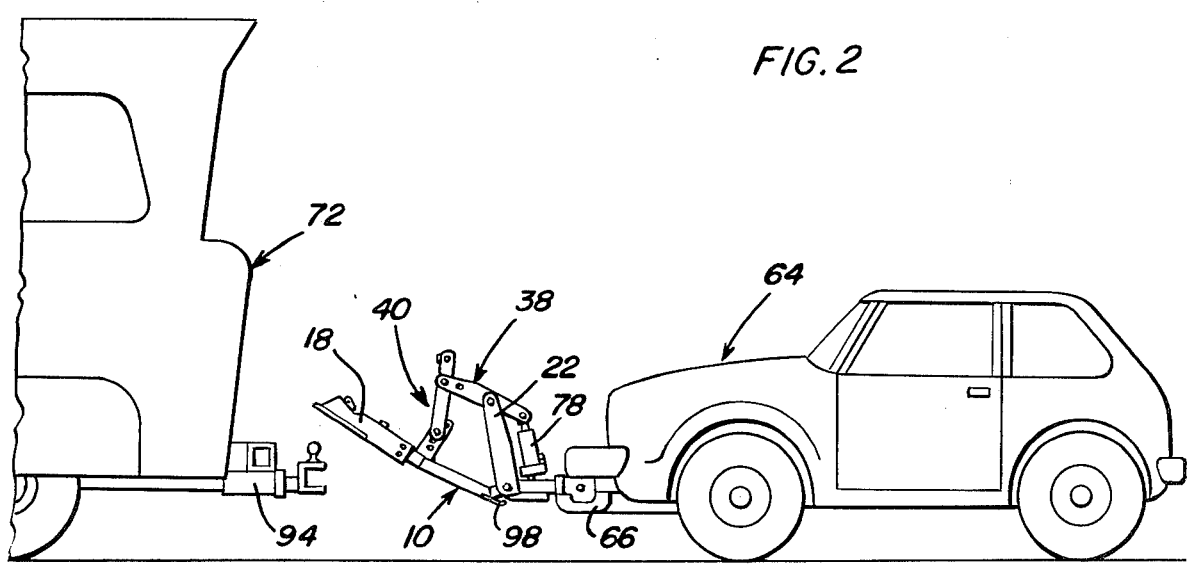
FIG. 2 is a side elevational view of the vehicle to be towed and the rear portion of a towing vehicle with the tow bar of the instant invention in a partially lowered position preparatory to removable coupling to the rear of the towing vehicle.

Referring now more specifically to the drawings, the numeral 10 generally designates the tow hitch of the instant invention. The tow hitch 10 includes first and second front and rear arm sections 12 and 14. The arm section 12 includes an upwardly angulated forward end portion 16 upon which a conventional socket hitch assembly 18 is mounted and the rear end of the arm section 12 includes an upwardly inclined rear end portion 20 pivotally anchored between a pair of opposite side upstanding plates 22 and 24 carried by the forward end of the arm section 14. The rear terminal end of the arm section 14 defines a mounting shank portion 26 of rectangular and tubular cross section and the mounting shank 26 includes longitudinally spaced pairs of opposite side aligned bores 28.

An upstanding anchor plate 34 is carried by the arm section 12 at the juncture between the latter and the forward end portion 16 and the anchor plate 34 is provided with a plurality of vertically spaced horizontal transverse apertures 36 formed therethrough.

First and second link assemblies referred to in general by the reference numerals 38 and 40 are provided and the link assembly 38 includes a pair of parallel opposite side plates 42 interconnected at one pair of corresponding ends by means of a spacer 44 secured therebetween. The plates 42 have the end portions thereof spaced apart by the spacer 44 pivotally mounted between the upper ends of the plates 22 and 24 by means of pivot fasteners 48.

The link assembly 40 includes a pair of elongated opposite side plates 50 and 52 secured together in spaced apart parallel relation by means of a cross brace 54 and one end of the link assembly 40 is pivotally connected between the ends of the plates 42 remote from the spacer 44 by means of a removable pivot fastener 58, the link assembly 40 including pairs of longitudinally spaced apertures 60 through which the pivot fastener 58 may be secured and the lever arm 38 including pairs of longitudinally spaced apertures 62 through which the pivot fastener 58 may be secured.

As may be noted from FIGS. 1, 2, 3 and 5 of the drawings, the vehicle to be trailed, referred to in general by the reference numeral 64, includes a hitch structure 66 defining a forwardly and horizontally outwardly opening socket 68 into which the shank portion 26 may be removably telescoped. The shank portion 26 may be secured within the socket 68 by means of a removable fastening pin 69. Further, the socket hitch assembly 18 may be readily removably coupled to the ball hitch element 70 carried by the rear of the towing vehicle, referred to in general by the reference numeral 72. Further, the shank portion 26 has a transverse upwardly projecting bearing bar 74 welded to the upper surface thereof adjacent the lower ends of the plates 22 and 24.

With the tow hitch 10 supported from the vehicle 64 in the manner illustrated in FIG. 1, the vehicle 64 may be driven into proper position behind the towing vehicle 72 and the forward arm section 12 may be allowed to swing downwardly to move the socket hitch assembly 18 into position removably coupled with the ball hitch element 70. Thereafter, the locking mechanism 76 of the socket hitch assembly may be actuated to secure the socket hitch assembly 18 against disengagement from the ball hitch element or assembly 70. Thereafter, a hydraulic ram 78 (a conventional hydraulic jack) may be positioned with its base 80 resting upon the bearing bar 74 and the upper end of the extendible piston rod portion 82 thereof positioned beneath the spacer 44. Thereafter, the hydraulic ram or jack 78 may be actuated in order to effect swinging movement of the link assemblies 38 and 40 from the positions thereof illustrated in FIG. 4 to the position thereof illustrated in FIG. 5 with the abutment flange 90 carried by the link assembly 40 abuttingly engaged with the link assembly 38 and the apertures 60 and 62 registered with each other to receive a removable locking bolt of pin 92 therethrough, whereby the link assemblies 38 and 40 will be locked against relative angular displacement and the hydraulic jack 78 may be collapsed and removed from the position thereof illustrated in phantom lines in FIG. 5.

Figure 3:
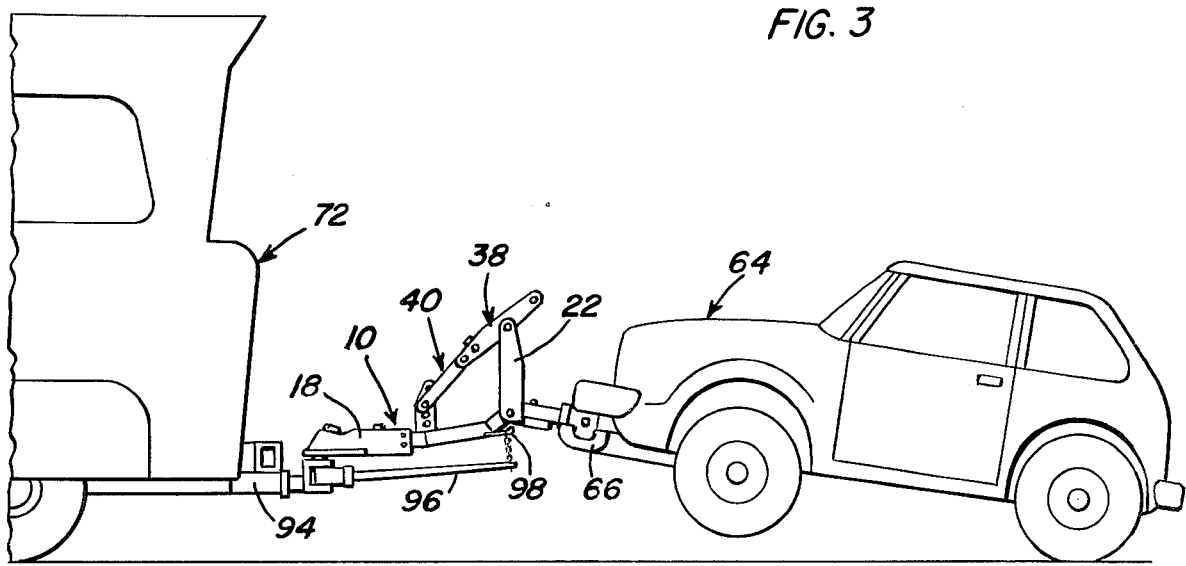
FIG. 3 is an elevational view similar to FIG. 2 but with the tow bar of the instant invention fully operatively connected between the vehicle to be trailed and the towing vehicle and with the forward end of the trailed vehicle elevated above the associated roadway.

By effecting relative angular displacement of the link assemblies 38 and 40 from the positions thereof illustrated in FIG. 4 to the positions thereof illustrated in FIG. 5, the front end of the vehicle 64 is elevated above the roadway in the manner illustrated in FIG. 3 of the drawings. Further, if the hitch assembly 94 of which the ball hitch element 70 comprises a part is of the "equalizing" type, the spring equalizing bars 96 thereof may be removably anchored to the opposite side anchor members 98 of the hitch 10 carried by the rear end portion of the arm section 12. In this manner, the "tongue weight" of the trailed vehicle 64 and the hitch 10 on the towing vehicle 72 will be effectively reduced.

With attention now invited more specifically to FIG. 9 of the drawings, there may be seen a modified form of tow hitch referred to in general by the reference numeral 10' and which is substantially identical to the tow hitch 10, except that the arm section 12' thereof is totally straight at its forward end portion. Otherwise, the various components of the tow hitch 10 are identical and are designated by prime reference numerals corresponding to those utilized to designate the corresponding components of the tow hitch 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated tow bar construction including first front and second rear generally horizontal elongated tow bar arm sections joined together at one pair of corresponding end portions in generally end aligned relation and for relative angular displacement about a horizontal transverse axis, the free end of one of said sections remote from the other section including first means adapted to be connected to a towing vehicle by an articulated connection, the free end of said other section remote from said one section including second means for fixed attachment to a towed vehicle, and third means operatively connected between said arm sections to forcibly effect relative angular displacement of said arm sections to depress said free ends relative to said one pair of ends thereof, said third means including rigid upstanding members carried by said first and second arm sections and spaced apart along said elongated tow bar construction, articulated connecting link means interconnected between upper portions of said upstanding members for angular displacement relative thereto, and force means interconnected between said connecting link means and one of said arm sections for angularly displacing said link means relative to said upstanding members whereby to force the upper end portions of said upstanding members apart.

2. The combination of claim 1 wherein said free end of said other section includes a terminal end shank portion adapted to be removably anchored in an endwise outwardly opening socket member mounted on said towed vehicle, said shank portion comprising said second means.

3. The combination of claim 1 wherein said first means includes a hitch member adopted for removable coupling to a tow hitch carried by said towing vehicle.

4. The combination of claim 3 wherein said hitch member comprises a socket hitch member for removable coupling to a ball hitch member.

5. The combination of claim 1 wherein said force means includes a hydraulic ram.

6. The combination of claim 5 wherein said third means includes lock means operative to lock said connecting link means in predetermined relatively angularly displaced position relative to said upstanding members independent of said hydraulic ram.

7. The combination of claim 6 wherein said lock means includes means operative to establish varied relatively angularly displaced positions of said arm sections at said predetermined positions thereof.

8. A tow bar construction including first and second generally horizontal two bar arm sections joined together at one pair of corresponding end portions in generally end aligned relation and for relative angular displacement about a horizontal transverse axis, the free end of one of said sections remote from the other section including first means adapted to be connected to a towing vehicle by an articulated connection, the free end of said other section remote from said one section including second means for fixed attachment to a towed vehicle, and third means operatively connected between said arm sections to forcibly effect relative angular displacement of said arm sections to depress said free ends relative to said one pair of ends thereof, said third means including an upstanding anchor member carried by a first of said arm sections adjacent the other arm section and an elongated articulated brace, including a pair of pivotally interconnected links, pivotally attached at its opposite ends to an upper portion of said anchor member and the second arm section at a point spaced therealong from said first arm section, said articulated brace including lock means operative to releasably lock said brace in its operative position with said links generally in end aligned relation.

9. The combination of claim 8 wherein the end of the link attached to the upper end of said anchor member includes an extended terminal end portion extending outwardly beyond the side of said anchor member remote from said second arm section and overlying said first arm section in spaced relation thereto, and an extendible hydraulic ram interposed between the extended terminal end and said first arm section, said ram comprising said third means.

10. The combination of claim 9 wherein said lock means includes registered transverse bores formed in said links when the latter are in generally end aligned relation, and a lock pin removably positioned in said registered bores.

11. The combination of claim 8 wherein said one arm section comprises said first arm section.

12. The combination of claim 8 wherein said second arm section includes an upwardly projecting anchor portion to which the corresponding end of said brace is pivotally attached, said anchor portion and brace end including coacting means operative to selectively position the pivot connection between said brace and anchor portion along the latter.

13. The combination of claim 12 wherein the end of the link attached to the upper end of said anchor member includes an extended terminal end portion extending outwardly beyond the side of said anchor member remote from said second arm section and overlying said first arm section in spaced relation thereto, and an extendible hydraulic ram interposed between the extended terminal end and said first arm section, said ram comprising said third means.

14. The combination of claim 13 wherein said lock means includes registered transverse bores formed in said links when the latter are in generally end aligned relation, and a lock pin removably positioned in said registered bores.

15. The combination of claim 14 wherein said free end of said other section includes a terminal end shank portion adapted to be removably anchored in an endwise outwardly opening socket member mounted on said towed vehicle, said shank portion comprising said second means.

* * * * *